United States Patent
Jarmain (12)

(10) Patent No.: US 6,267,226 B1
(45) Date of Patent: Jul. 31, 2001

(54) BUCKET ELEVATOR IMPROVEMENTS

(76) Inventor: Paul Laurence Jarmain, 72 Labrina Avenue, Prospect SA 5082 (AU)

( * ) Notice: Subject to any disclaimer, the term of this patent is extended or adjusted under 35 U.S.C. 154(b) by 0 days.

(21) Appl. No.: 09/269,899

(22) PCT Filed: Oct. 3, 1997

(86) PCT No.: PCT/AU97/00664

§ 371 Date: May 27, 1999

§ 102(e) Date: May 27, 1999

(87) PCT Pub. No.: WO98/15478

PCT Pub. Date: Apr. 16, 1998

(30) Foreign Application Priority Data

Oct. 4, 1996 (AU) .................................................. PO2770

(51) Int. Cl.[7] .............................. B65G 17/36; B65G 35/00
(52) U.S. Cl. ........................... 198/701; 198/708; 198/710
(58) Field of Search .................................... 198/509, 518, 198/710, 701, 702, 703, 707, 708

(56) References Cited

U.S. PATENT DOCUMENTS

| 4,722,433 | * | 2/1988 | Gough | 198/710 X |
| 4,737,061 | * | 4/1988 | Eisold | 198/509 X |
| 4,860,884 | | 8/1989 | Kostrewa . | |
| 4,958,721 | * | 9/1990 | Redford | 198/710 |
| 5,339,612 | | 8/1994 | Scott . | |

FOREIGN PATENT DOCUMENTS

| 86025/75 | 5/1977 | (AU) . |
| 27725/89 | 7/1990 | (AU) . |
| 3234230 | 3/1983 | (DE) . |
| 508916 | 10/1992 | (DE) . |
| 2 437 152 | 4/1980 | (FR) . |
| 2 512 631 | 3/1983 | (FR) . |
| WO 92/01616 | 2/1992 | (WO) . |

* cited by examiner

Primary Examiner—Christopher P. Ellis
Assistant Examiner—Gene O. Crawford
(74) Attorney, Agent, or Firm—Akerman Senterfitt

(57) ABSTRACT

A bucket elevator for use in grape harvesting which has buckets in sequential alignment which are each attached to a bucket elevator chain so that the orientation of each bucket will remain that of the chain to which it is attached. There are disclosures of shapes of buckets to facilitate collection, emptying and carrying materials and to avoid allowing spaces between the buckets which will ensnare with materials being carried.

9 Claims, 5 Drawing Sheets

BUCKET ELEVATOR IMPROVEMENTS

Figure 1:
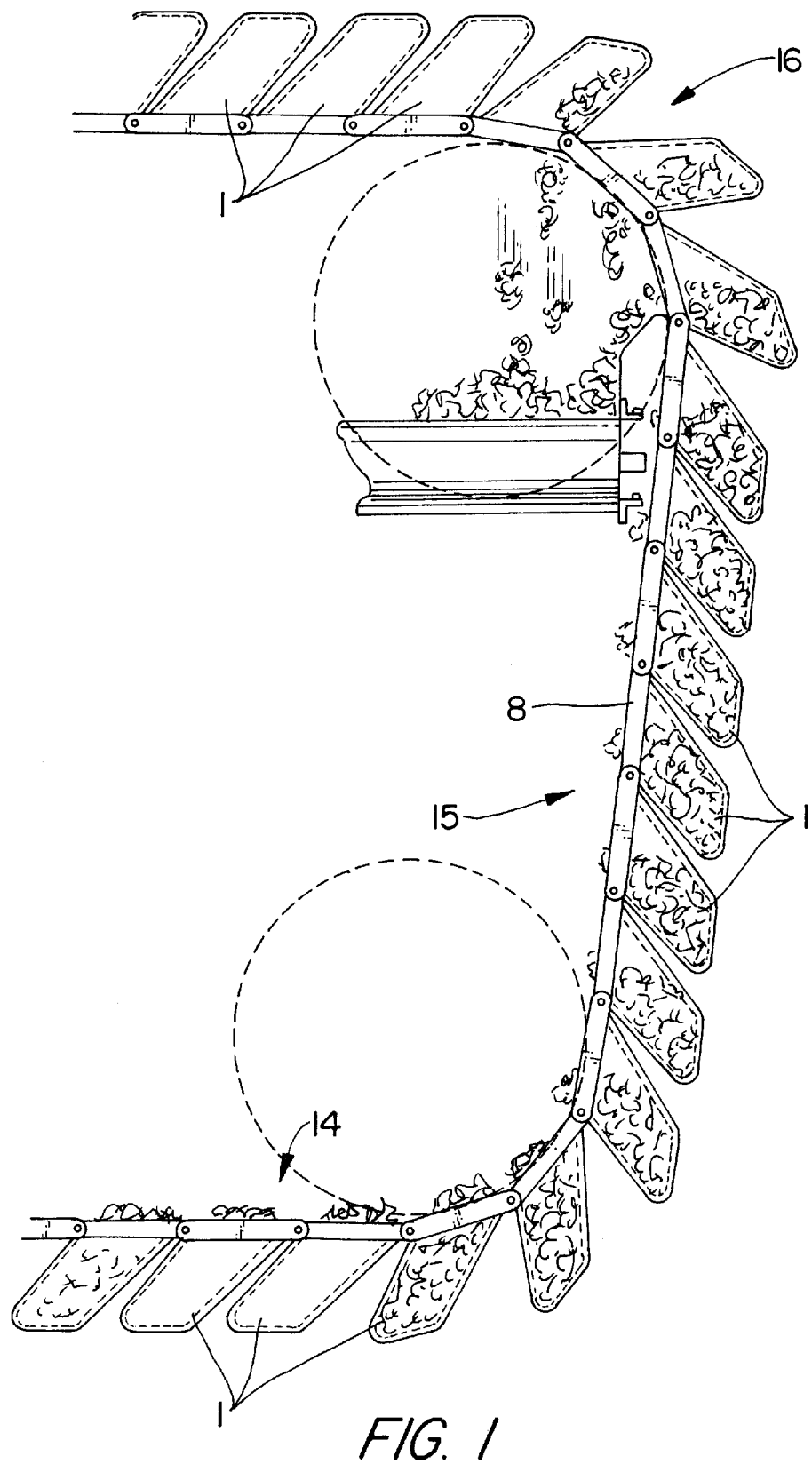

This invention relates to harvesting machines for fruit including grapes and it relates in particular to bucket elevators used in these machines.

The application in respect of which the invention was developed is the use of a bucket elevator to lift just harvested grapes to an elevated position.

However, it is recognized that other fruits may be able to be harvested by very similar machines and currently dwarf olives are a possibility. Accordingly, at least to some extent the principals of this invention can be applied more broadly to similar applications.

It is conventional for bucket elevators for these harvesters to have a chain or chains which support a plurality of buckets aligned in echelon each of which is supported by a pivot connection with respect to the chain so that each bucket can in turn have its relative position to the chain changed so that as it progresses from a collection position to an elevating position, its orientation however may stay the same despite the chain following a path giving it a different orientation.

In this way, each bucket keeps its open mouth uppermost for most effective storage capacity of both fruit and any juice.

When the buckets are carried to an discharging station, conventionally external means guide each bucket so that its orientation is then changed relative to the chain so that its open mouth is turned to be lowermost and the contents are emptied thereby.

This is the currently existing system.

I have discovered that this system can be improved.

I have noticed for instance that there can be difficulties with the current system when all of the incidental debris as well as grapes are loaded onto the buckets at the collection station.

This debris can include stalks and limbs of vines and these can project in all directions and be pushed into all sorts of places.

When a bucket is reorientated from a collection position to an elevating position, its position changes relative to the chain and if this action happens to ensnare materials such as limbs of vine, then either the orientation is not fully accomplished or when the orientation is forced to change, and this is not possible because of some ensnaring debris, then buckets can be either distorted or broken.

One of the major problems with one or more of the buckets being broken is that, if the harvester is to be continued to be used, and at harvest time this is normally essential, the bucket has to be rapidly replaced and the elevating bucket system cannot simply be used without potentially serious loss of harvested materials. This results in delays and if the period is critical as far as collecting the material to be harvested at a critical time, then the results can be more serious because of delay in harvesting.

An object of this invention is to propose an arrangement for a harvester including a bucket elevator which at least reduces the above difficulties.

In accord with one form of this invention, there is proposed a grape harvester including a bucket elevator with a bucket elevator chain with buckets arranged to collect grapes and grape juice at a lowermost collection station in each of the buckets and elevate these to a discharge station where the buckets are each attached to the chain so that the orientation of the bucket in each case will remain as that of a chain link of the chain adjacent which it is located and affixed and where the grapes and juice will be thereby retained within each respective bucket by reason of the shape and the orientation of the respective buckets through from the collection station to the discharge station, wherein said collection station extends across a collection area where each bucket is held in a collection position with its mouth uppermost while it passes across said extended collection station whereby the grapes and juice will be retained within each respective bucket by reason of the shape, position and the orientation of the respective buckets through from the collection station to the discharge station.

This then proposes a quite radical change to the current system.

Rather than having as hitherto, a bucket that is allowed to pivot or move more or less independently of the orientation of the chain or the links to which it is adjacent or even affixed, the concept now is to have the chain define the orientation.

I will now explain how and why this provides an answer to the problem set out above.

By having each bucket secured so as to follow the orientation of its associated link of a chain, means that each adjacent bucket can be located essentially adjoining one another at least in so far that each has an uppermost open face during a collection station period.

Next, by realising that the shape of a holding cavity of a bucket can be effective to hold product such as harvested grapes and juice both when its open mouth is uppermost or to one side of the holding cavity, means that one is no longer constrained to have to reorientate the bucket with respect to the chain.

As an example of the changed relationship of the mouth with the holding cavity of a bucket, in a preferred arrangement then there is provided that a rear wall of a cavity is rearwardly inclined from an upper edge defining a rearward most edge of the uppermost mouth all of this when the bucket is in the collection position. In preference, a front wall is more or less parallel to the back wall so that there can be provided a holding capacity in which both front and rear walls are more or less parallel one with respect to the other and sides walls are likewise parallel one with respect to the other so that with this arrangement, not only will the bucket collect and hold product when the mouth is uppermost, but when the bucket is then inclined because it must follow the inclination of the chain when in an elevating position, while the mouth then orientates to a vertical or toward a vertical orientation, none the less, because of the internal holding shape, the bucket will still hold substantially the contents originally collected when the bucket was in the collection position.

While at first thought, it might be considered that this would limit the capacity of the bucket elevator by having to have an inclined cavity, in practice it is found that there can be in fact an increased capacity because firstly the chain can be operated at a faster speed without apparently increased fear of breakage of buckets and secondly, the size and depth of the holding shape of the buckets is not restricted.

In another form of the invention there is provided a grape harvester including a bucket elevator of a type in which a chain is adapted to support a plurality of buckets in echelon alignment, and to convey the buckets from a collection position to an elevating position, then to an discharging positing and then to the collection position characterised in that each bucket is secured and supported so that its orientation remains that of the chain link adjacent to which it is located , and such that in the collection position each bucket is located to be positioned relative to adjoining buckets so that at least in a substantially forward to rearward direction there is an uppermost continuous collection area for collection of materials to be elevated, the buckets being further arranged to collect grapes and grape juice at a lowermost collection station in each of the buckets and elevate these to a discharge station and where the grapes and juice will be thereby retained within each respective bucket by reason of the shape and the orientation of the respective buckets through from the collection station to the discharge station wherein said collection station extends across a collection area where each bucket is held in a collection position with its mouth uppermost whereby the grapes and juice will be retained within each respective bucket by reason of the shape, position and the orientation of the respective buckets through from the collection station to the discharge station.

Further, the invention can reside in the method of handling materials which comprises the steps of using a bucket elevator arrangement of the type described and so characterised as well as use of a bucket elevator chain with attached buckets in the manner described.

While the manner of manufacture and orientation of the chain or chains can be in accord with many various techniques, in one preferred form there are provided two sets of chains providing links where each bucket is secured both front and rearwardly by being attached to a pin passing jointly across from one chain to another.

When a reference is made to a bucket, it is intended that this should be a general description and can describe a bucket made from either metal or plastics although in this embodiment it has been found that manufacture from plastics materials is preferred.

In preference, the shape of the buckets is such as to provide an effective carrying or discharging cavity shape for each of three orientations established by the orientation of links of the chain to which the bucket is associated or attached namely, a collection position, a lifting position and an discharging position.

A fruit harvester including a bucket elevator with a bucket elevator chain with buckets arranged to collect fruits and juice of the fruits at a lowermost collection station in each of the buckets and elevate these to a discharge station where the buckets are each attached to the chain so that the orientation of the bucket in each case will remain as that of a chain link of the chain adjacent which it is located and affixed and where the fruits and juice will be thereby retained within each respective bucket by reason of the shape and the orientation of the respective buckets through from the collection station to the discharge station wherein said collection station extends across a collection area where each bucket is held in a collection position with its mouth uppermost while it passes across said extended collection station whereby the grapes and juice will be retained within each respective bucket by reason of the shape, position and the orientation of the respective buckets through from the collection station to the discharge station.

In a further preferred feature, each bucket is shaped and located so that when the respective buckets are orientated to an elevating position, the buckets do not have closing faces at the open side of respective cavities between adjacent buckets.

This then is how the buckets can be used so that they will not have the unfortunate problem of having to jam against debris and be subject therefore to potentially damaging forces.

In a further preferred feature, the holding cavity shape in respect of each bucket is aligned with respect to uppermost edges defining the open top so that when the bucket is in a collection position with the open top uppermost, there is at least some of the holding cavity located lower than and more rearward than a rearward most lip of the open top.

The extent to which this holding capacity can therefore be predominantly rearward can be selected but it is this feature that is of assistance in a preferred form to provide the effect of bucket shape to achieve the answer to the problem.

In preference, the wall of a bucket extending from a rearward most lip to the bottom of the cavity is substantially planer and a front wall is shaped and is of planer alignment and inclined so as to be more or less parallel to the back wall.

In this way, when the buckets are supported adjacent one another with the chain straight, the buckets fit efficiently one adjacent the other. Further, with planar sides, one can obtain a greater capacity while providing for an efficient discharging shape.

For a better understanding of this invention it will now be described with relation to a preferred embodiment it being emphasised that it is not intended the invention should be necessarily limited to any single statement described so that the purpose of the description is to illustrate and not limit the invention.

Figure 2:
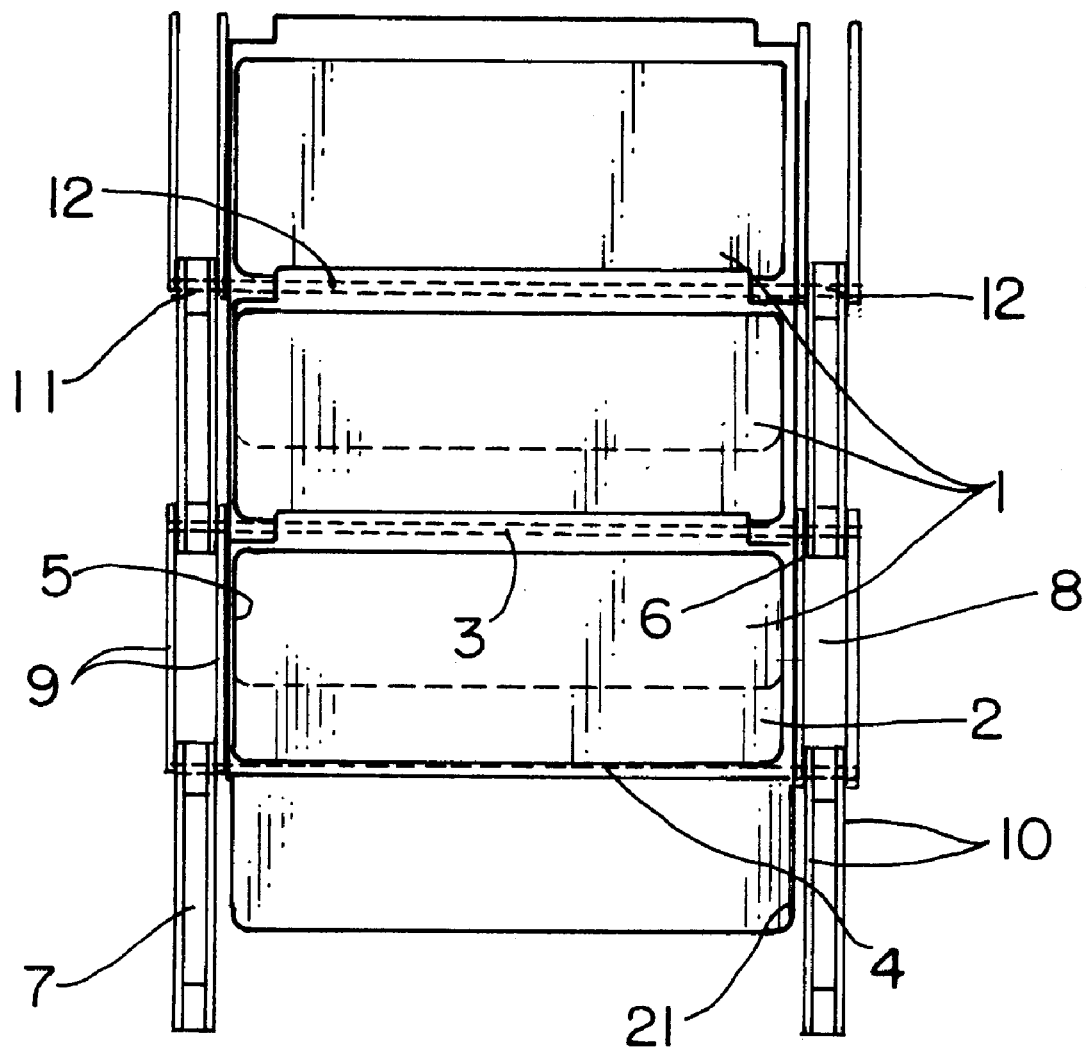
Figure 3:
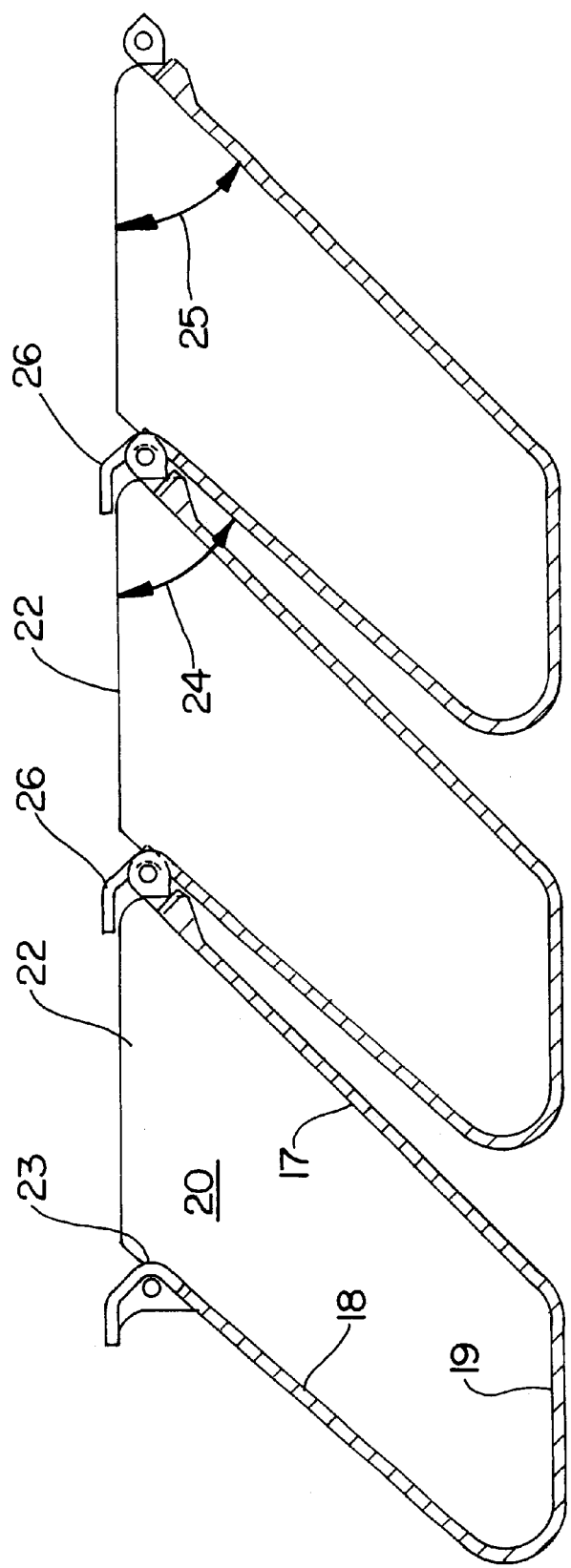
Figure 4:
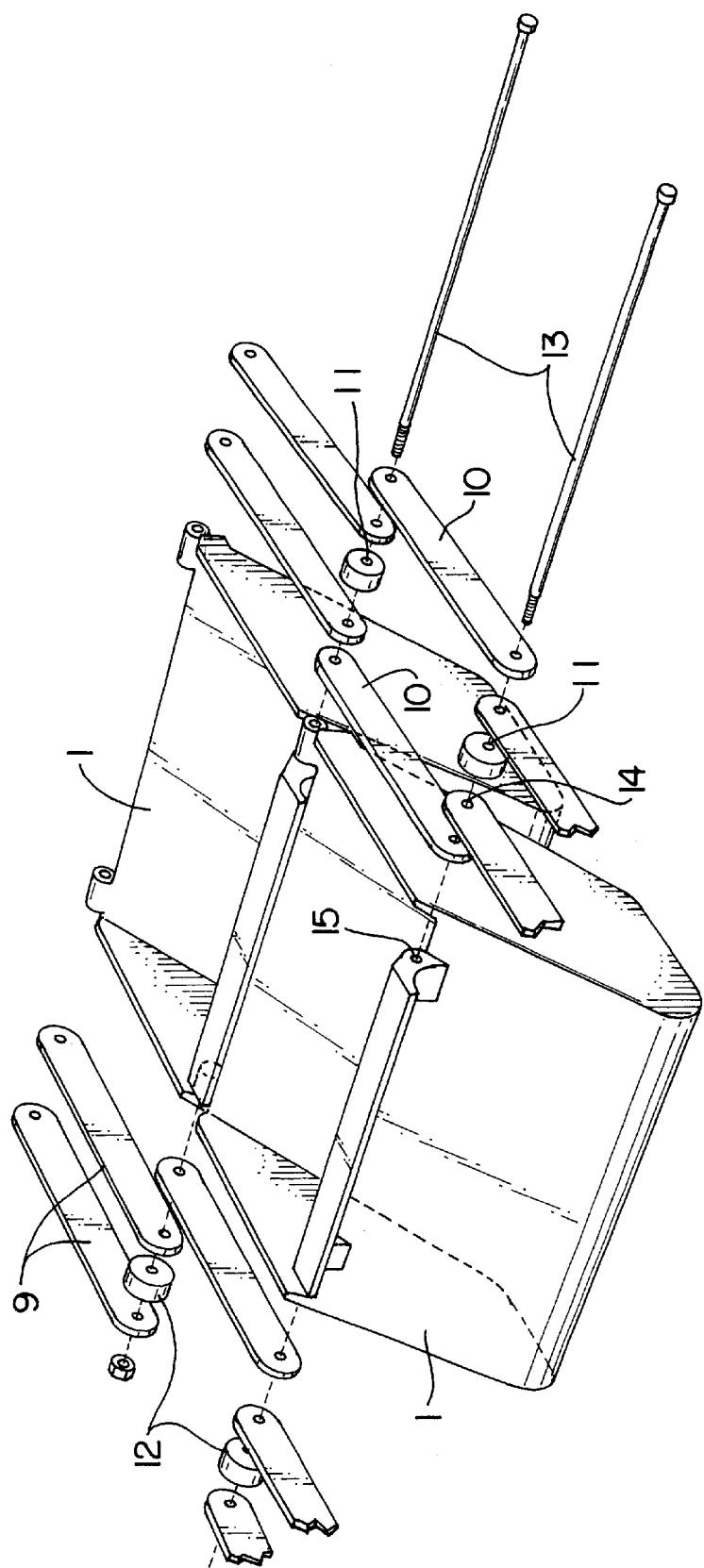
Figure 5:
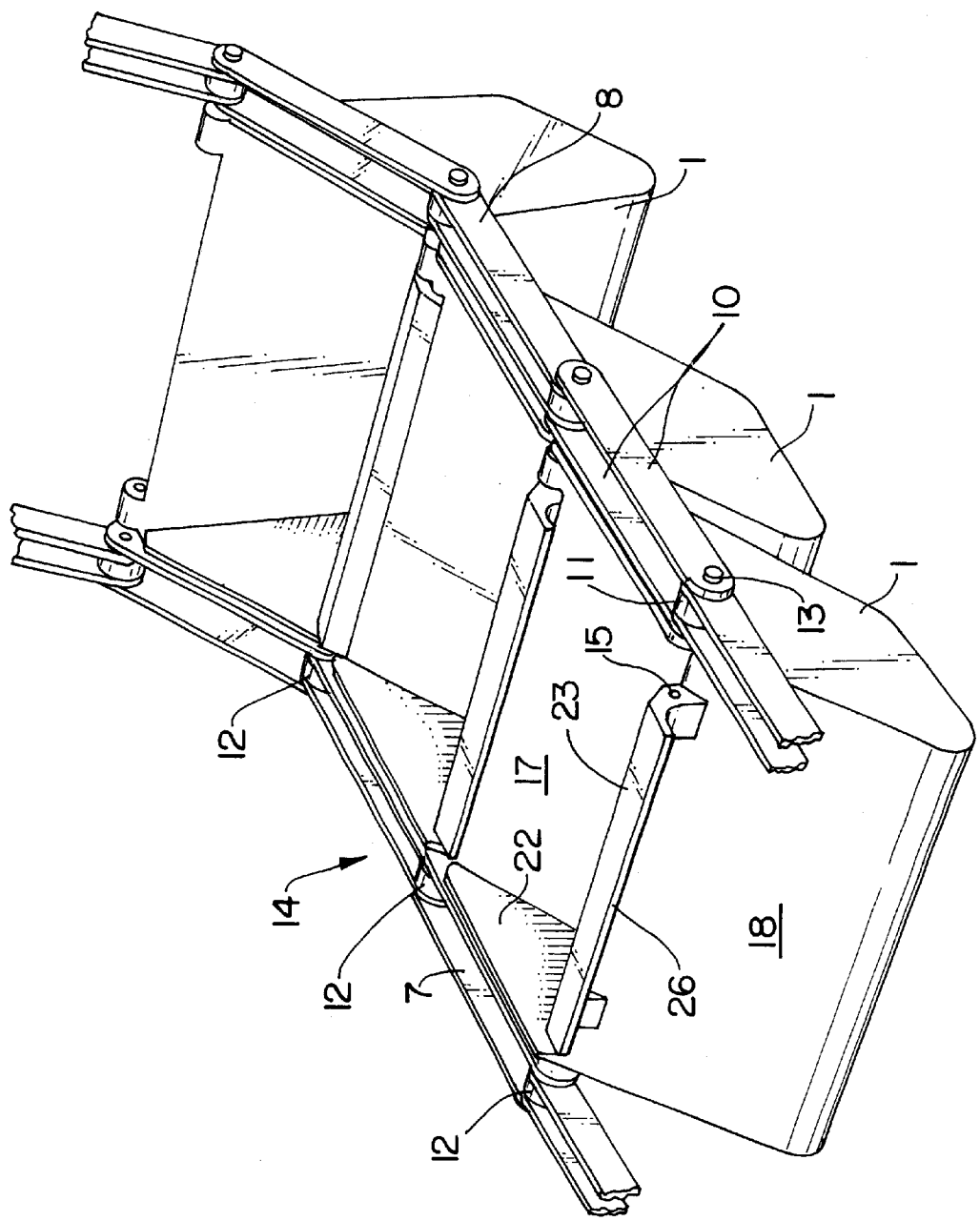

Accordingly the embodiment will now be described with the assistance of drawings wherein:

FIG. 1 is a side elevation of a bucket elevator as would be used in a grape harvester shown having buckets being drawn through a collection station, up an elevating station and through to an discharging station, FIG. 2 is a plan view of a part of the bucket elevator chain with buckets when in a collection position, FIG. 3 is a side elevation cross section of buckets in a collection position but separated from the chain, FIG. 4 is an exploded view in perspective showing the shape of the bucket, the construction of the chain link adjacent and affixed to the bucket, and details of how the bucket in the embodiment can be affixed to a chain, and FIG. 5 is a perspective view of the bucket elevator in its assembled form and preceding from a collection station.

Referring in detail to the drawings, there are a plurality of buckets shown typically at 1 each of which is of elongate dimensions so that it has an outermost mouth 2 which has long front lip 3 and a long parallel back lip 4 each of which is parallel one to the other and these are boarded by side walls 5 and 6 so that there is provided a substantially rectangular shape boarded by on each side a chain 7 in one case and 8 in the other.

Each chain is comprised of links shown typically at 9 on one side and 10 at the other which are coupled together by pivot connectors shown at 11 and 12 typically.

Each bucket 2 is fixed with respect to the chains 7 and 8 so that the orientation of the bucket is locked to be that of the links of the chain which are adjacent the bucket.

This is achieved by having common pivot axis for front and back connectors of a link also having a shaft 13 passing jointly through respective ends of links 10, bush 11, aperture 14 of an adjacent link and aperture 15 in the bucket 1.

The shaft 13 passes fully through from one side to the other so that the exploded view as shown in FIG. 4 has the same arrangement on the left hand side of the bucket 1 as is shown on the right hand in the illustration.

This then shows how each bucket is secured so as to maintain its orientation as being that of the linkage of the chain.

In order to maximise the carrying capacity of the respective bucket both when in a collection station as shown at 14, and when in elevating station at 15 and adapted to effect effective discharging when in an discharging station at 16 each bucket comprises a forward wall 17, a rearward wall 18, a bottom 19 and side walls 20 and 21.

These together define a holding area which has an open top when the bucket is in a collection position as shown for instance in FIG. 3 with the open top being defined by lips 22 which follow a plane which is approximately horizontal.

The alignment of the rear wall 18 relative to the uppermost open top 22 is such that there is at least some of the holding capacity of the bucket which is lower and more rearward than the rearward most lip shown at 23 at the open top 22.

Further, the wall 18 is planar and has an inclination relative to the open top 22 of approximately 50° as shown at 24 and the front wall also being planar and having an inclination similar to the rear wall 18 but is chosen to provide a slightly tapering shape between the two so that the angle shown at 25 is 45° so that there is in effect a 5° taper between the two.

This orientation provides for both a substantial collection capacity when the mouth 22 is uppermost that is the bucket is in the collection position as shown at 14 and it will maintain most of its holding capacity when the mouth is inclined so that the bucket itself is in an elevating position as shown in the elevating station at 15.

In trials conducted so far, with grapes freshly harvested, the holding capacity from the collection station position to the elevating position is a very small change and in any event, if there is any fallout, the material that might fall, will still fall into the oncoming buckets so the material as such is not lost.

The next feature relates to the continuous collection area.

This is now achieved by reason that the uppermost open tops at 22 are almost adjoining and at least in a forward to rearward direction, there is provided a rearwardly extending lip 26 which continues to cover any incidental gap that might otherwise exist.

In this way, it can be shown that in a collection position, each bucket is located to be positioned relative to adjoining buckets so that at least in a substantially forward to rearward direction there is an uppermost continuous collection area for collection of materials to be elevated.

A further feature is that this can provide that there are no closing faces or surfaces which by reason of the changing orientation of a respective bucket will be caused to come together when the buckets are transferred from the collection station to the elevating station or anywhere else.

Such a closing surface which is accessible to the uppermost areas when in the collection position, means that there is no likelihood of pieces of collected debris being caught between such closing faces and therefore jamming in these and potentially causing destructive forces.

At the least, there is very much less opportunity for this to occur with the arrangement described.

Finally, at the discharging station 16, as will be seen especially in FIG. 1, the shape of the container is also now conducive to discharging both because of the substantial orientation of the walls when the container is upside down, and there would appear to be little disadvantage from having the inclined holding capacity.

Nothing in this description requires that the collection position should have the chain so that the upper mouth is necessarily truly horizontal nor in the elevating station, exactly perpendicular to the horizontal when the apparatus as a whole is located on level ground.

In other words, the positioning of the chain can also be optimised for the collection shapes.

It appears now from the experiments conducted so far, that the arrangement described is economic to install and practical in application.

It appears to have overcome at least several significant problems that have hitherto been experienced with harvesters with bucket elevators of traditional type which is to say there would appear at least in relation to the embodiment less opportunity for the debris to jam between closing surfaces of the buckets, and in both manufacture and in application, there appears to be some economic advantage because the orientation of the buckets is controlled directly by the chain and not having to be controlled by external means.

A number of changes can be envisaged which would still incorporate the invention but are not specifically described as the preferred embodiment.

For instance, each bucket is currently moulded from plastics material but clearly could be made from other materials.

The chain construction comprises two chains with links extending in each case between a front and back lip of each bucket but other configurations may be equally useful and feasible.

The application has been discussed with grapes and grape harvesters but the invention is intended to be extended harvesters for fruit and the like and the juices of these.

There is specific advantage in grape harvesters and the embodiment has been specifically designed for this purpose but again it is stressed it is not intended the invention should be limited merely to this application.

What is claimed is:

1. A bucket elevator, comprising:

at least one bucket elevator chain;

a plurality of buckets arranged to collect grapes and juice at a lower collection station and elevate the grapes and juice to a discharge station;

wherein said buckets have a mouth configured to receive the grapes and juice;

wherein front and rear portions of said buckets are attached to said chains so that the orientation of each of said buckets remains that of the chain to which it is attached, thereby reducing spacing between said buckets, whereby the grapes and juice are retained within said buckets by reason of the shape and orientation of said buckets from the collection station to the discharge station; and wherein said collection station extends across a collection area, and said buckets are arranged in a collection position as said buckets traverse said collection area, said collection position including said mouth oriented substantially upright, whereby the grapes and juice will be retained within said buckets by reason of the shape, position and orientation of said buckets from the collection station to the discharge station.

2. The elevator according to claim 1, wherein said mouth of at least one of said buckets has a rear wall, said rear wall having an upper edge and a lower edge, wherein said rear wall inclines from said lower edge to said upper edge of when said bucket is in a collection position.

3. The elevator according to claim 1, wherein said bucket has a front wall approximately parallel to a rear wall, and substantially parallel side walls, wherein said front, rear, and side walls provide a holding capacity for the grapes and juice.

4. The elevator according to claim 1, further comprising a plurality of chains having links; and wherein front and rear portions of said buckets are secured by being attached to at least one pin extending from one chain to another.

5. The elevator according to claim 1, wherein said buckets are shaped to provide an effective carrying or discharging cavity for the grapes and juice while said buckets are oriented in at least one of the collection position, a lifting position, and a discharging position.

6. A bucket elevator, comprising:

at least one chain adapted to support a plurality of buckets in echelon alignment, and to convey said buckets from a lower collecting station, through an elevating station, and to a discharging station, and then return said buckets to the collecting station, said buckets having a mouth configured for receiving materials to be elevated;

wherein front and rear portions of said buckets are secured to and supported by said chains so that the orientation of each said bucket remains that of the chain link with which it is associated, thereby reducing spacing between said buckets;

wherein, at the collecting station, each of said buckets is positioned relative to adjoining buckets so that, at least in a substantially forward to rearward direction, there is a continuous collection area for collection of materials to be elevated;

wherein said buckets are configured to collect materials to be elevated at the collecting station and elevate the materials to the discharging station, said configuration permitting retention of the materials within said buckets by reason of the shape and orientation of said buckets from the collecting station to the discharging station; and wherein said collecting station extends across a collecting area in which said buckets are arranged in a collecting position with its mouth uppermost, whereby the materials are retained within said buckets by reason of the shape, position, and orientation of said respective buckets from the collecting station to the discharging station.

7. The elevator according to claim 6, wherein each of said buckets comprises a holding cavity having an upper edge; and wherein said upper edges of said holding cavities are aligned and define an open top of each said bucket so that, when a said bucket is in the collecting position, at least a portion of said holding cavities are located lower and more rearward than a rearward most portion of said open top.

8. The elevator according to claim 6, wherein at least one of said buckets comprises a cavity having an upper edge, a lower edge, a front wall, and a rear wall, wherein said rear wall inclines from said lower edge to said upper edge, and wherein said cavity is substantially planar, and said front wall is substantially planar and inclined so as to be substantially parallel to said rear wall.

9. A bucket elevator, comprising:

at least one bucket elevator chain;

buckets arranged to collect fruits and juice of the fruits at a lower collection station and elevate the fruits and juice to a discharge station;

wherein front and rear portions of said buckets are attached to said chains so that the orientation of said buckets remains that of the chain to which it is affixed, thereby reducing spacing between said buckets, whereby the fruits and juice are retained within said buckets by reason of the shape and the orientation of the said buckets from the collection station to the discharge station; and wherein said collection station extends across a collection area, and said buckets are arranged in a collection position as said buckets traverse each said collection area, said collection position including said mouth oriented substantially upright, whereby the fruits and juice will be retained within said buckets by reason of the shape, position and orientation of said buckets from the collection station to the discharge station.

* * * * *